United States Patent
Ulrich et al.

[11] 3,725,809
[45] Apr. 3, 1973

[54] DIELECTRIC RING LASERS USING WAVEGUIDING

[75] Inventors: Reinhard Ulrich, Matawan; Heinz Paul Weber, Middletown, both of N.J.

[73] Assignee: Bell Telephone Laboratories, Incorporated, Murray Hill, Berkeley Heights, N.J.

[22] Filed: Apr. 5, 1971

[21] Appl. No.: 131,296

[52] U.S. Cl. ............................331/94.5, 350/96 WG
[51] Int. Cl. ............................H01s 3/00, G02b 5/14
[58] Field of Search .................331/94.5; 350/96 WG

[56] References Cited

UNITED STATES PATENTS

| | | | |
|---|---|---|---|
| 3,585,521 | 6/1971 | Baugh | 331/94.5 |
| 3,222,615 | 12/1965 | Holly | 331/94.5 |
| 3,197,715 | 7/1965 | Ashkin | 331/94.5 |
| 3,140,451 | 7/1964 | Fox | 331/94.5 |

*Primary Examiner*—Ronald L. Wibert
*Assistant Examiner*—V. P. McGraw
*Attorney*—R. J. Guenther and Arthur J. Torsiglieri

[57] ABSTRACT

There is disclosed a ring laser in which mode-controllable oscillations occur in a dye-doped dielectric film along an axis wrapped around a lower-index dielectric. Output coupling is typically achieved by fringing field coupling to a nearby dielectric body of higher index.

4 Claims, 5 Drawing Figures

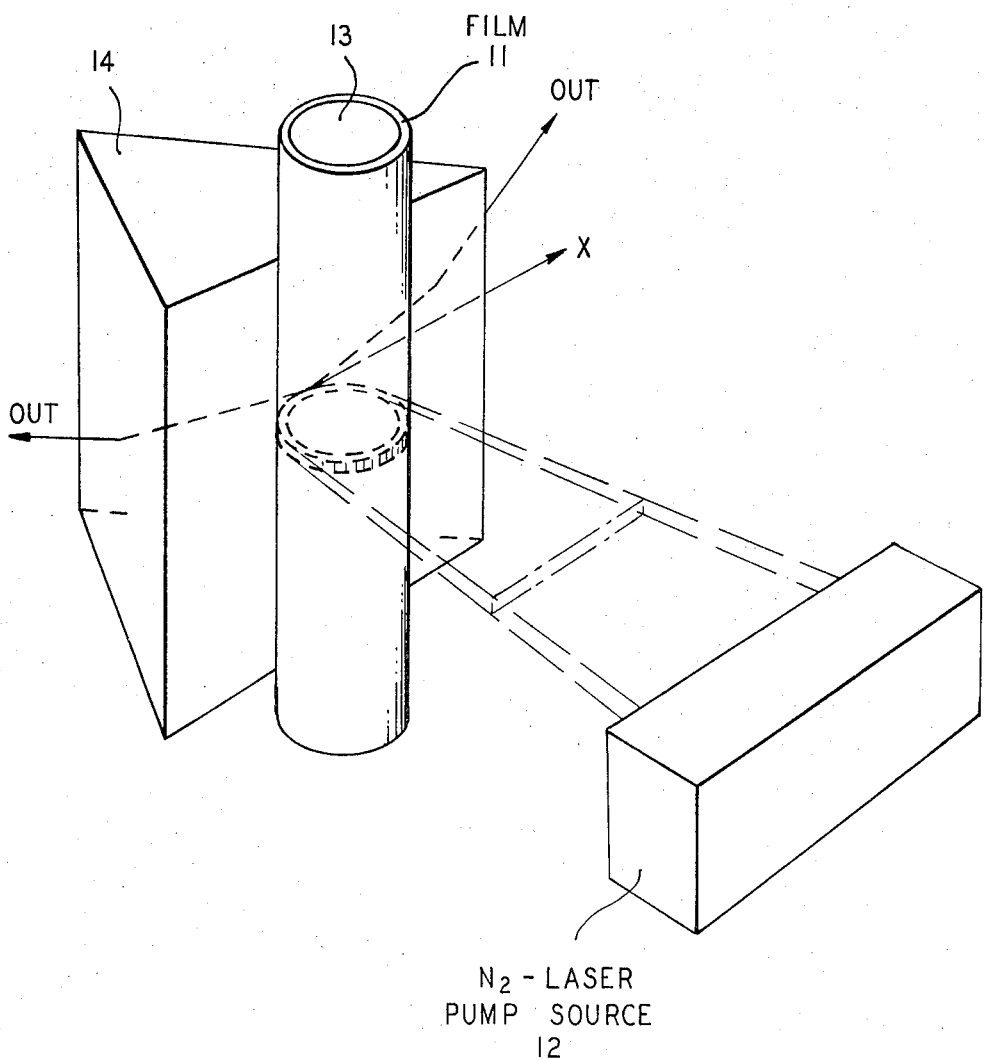

DIELECTRIC RING LASERS USING WAVEGUIDING

BACKGROUND OF THE INVENTION

This invention relates to lasers in bodies of material having at least one dimension suitable for optical guiding and particularly to ring lasers employing such bodies. Much of the recent development of the laser art has been directed toward the use of thin films of materials in transmitting and processing the laser light. This research has led gradually to the conclusion that it may be feasible to devise optical integrated circuits employing thin films.

Nevertheless, efforts to produce laser action directly in thin films have been largely unsuccessful. While the reasons for this are various, some of the more important reasons are related to the difficulties in establishing the required feedback of the guided light. For example, high optical losses are typically associated with providing a laser resonator for laser action in the thin film. As a consequence, the laser sources used in typical work with optical thin films are still relatively bulky laser sources which limit the degree of miniaturization and compactness of the integrated circuit.

Furthermore, quite apart from optical integrated circuits, it would be desirable to have sources of laser light that are not dependent upon the critical alignment of the typical optical resonator. Eliminating the resonator alignment problems would make it feasible to use lasers for many practical uses in small businesses of many types. For example, such lasers could be used by automobile service station men or others for testing automobile exhaust for incomplete combustion or air pollution. They could also be used by a repairman in the field for making many kinds of tests.

SUMMARY OF THE INVENTION

Our invention is based on our discovery of ring laser action in a thin film of a transparent dielectric medium mixed with a laser-active medium such as a dye.

A feature of our invention is directed to a ring laser in which mode-controllable oscillations occur in an active dielectric light-guiding film along an axis wrapped around a lower-index dielectric. The feedback for laser oscillation occurs by continuing propagation of the stimulated light along that axis, which closes upon itself. Output coupling is typically achieved by fringing field coupling to a nearby dielectric body of higher index.

In a specific successful embodiment of our invention, the ring laser is formed by a single-mode, light-guiding thin film of rhodamine 6G doped polyurethane coated on the surface of a cylindrical glass rod.

BRIEF DESCRIPTION OF THE DRAWING

Further features and advantages of our invention will become apparent from the following detailed description, taken together with the drawing, in which:

FIG. 1 is a partially pictorial and partially block diagrammatic illustration of an illustrative embodiment of our invention;

DESCRIPTION OF ILLUSTRATIVE EMBODIMENT

Figure 2A:
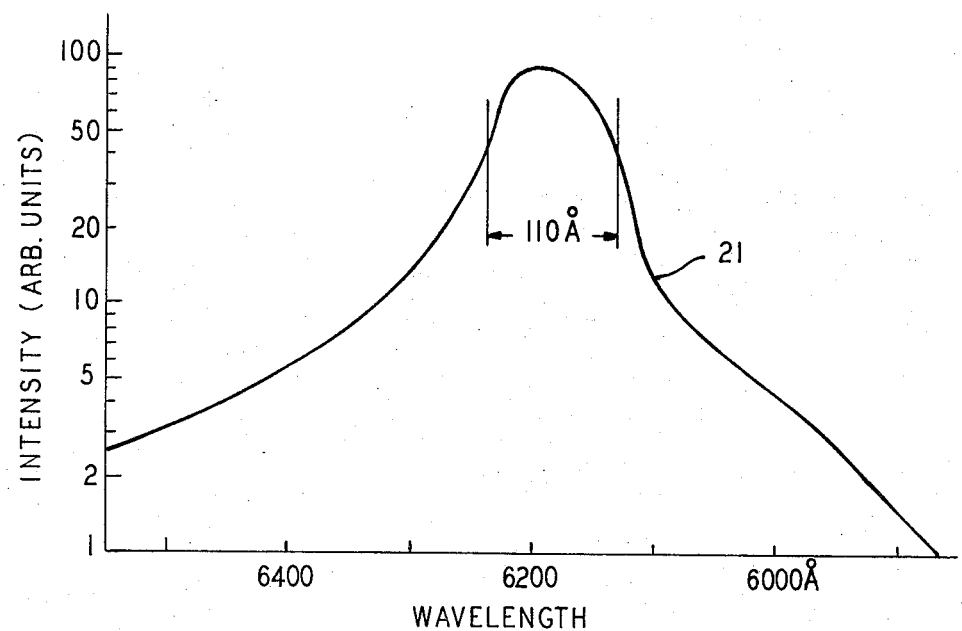
FIGS. 2A and 2B show curves useful in explaining the observed operation of the embodiment of FIG. 1.

Our observation of the stimulated emission of coherent radiation in thin-film light guides offers the possibility of constructing lasers that are completely compatible with optical integrated circuits. In the embodiment of FIG. 1 are shown the basic elements of the apparatus in which we have obtained what we believe to be one of the first successful laser oscillations in a light-guiding thin film. While the embodiment of FIG. 1, to be described herein, is not necessarily the precise form that would be desirable in an optical integrated circuit, its performance should be obtainable in equivalent modified embodiments. We have observed gains as high as 100 dB/cm in single-mode light-guiding thin films in the embodiment of FIG. 1.

In FIG. 1, the light-guiding thin film 11 is a polyurethane film doped with rhodamine 6G dye and pumped by a pulsed nitrogen laser source 12.

The doped light-guiding film 11 is applied on the surface of a cylindrical glass rod 13. In this way, a closed optical path is established along any circumference of the rod. This closed path provides the feedback required for laser action. The laser action will take place along a given circumference if the gain along that circumference exceeds the round-trip loss. Since the material is homogeneous along this path without surfaces intervening in the path, very low losses can be obtained.

In the embodiment of FIG. 1, the laser light generated in the film is coupled out for utilization by a prism-film coupler of the type disclosed and claimed in the copending patent application of P. K. Tien, Ser. No. 793,696, filed Jan. 24, 1969, assigned to the assignee hereof, and now U.S. Pat. No. 3,584,230, issued June 8, 1971. The prism-film coupler is implemented by a flint glass isosceles prism 14 which is brought substantially into contact with film 11, but in practice is separated by a small air gap therefrom because of dust particles and minor surface imperfections in the adjacent surfaces of film 11 and prism 14.

Two output beams are obtained because of the directional nature of the coupling through prism 14. These output beams correspond respectively to clockwise and counterclockwise oscillations of the laser light about the circumference of rod 13 in film 11 as viewed along the axis of rod 13 in either direction. Either of the two output beams can be used in a suitable utilization apparatus (not shown), which could be a sample of gas or other material to be analyzed and a suitable detector or spectrometer.

The following specific details apply to our successfully operated experimental model of the embodiment of FIG. 1. The pulsed nitrogen laser pump source operated at a wavelength of 3371 A. and, because of its transverse discharge configuration, emitted a sheetlike beam of rectangular cross section that pumped a narrow (approximately 0.2 millimeter high) circumferential strip of the film 11. The diameter of the rod in this experiment was 5 millimeters. At peak intensity, a pump power of approximately 15 kilowatts in 10 nanosecond pulses was incident on the laser rod. The pump intensity thus provided was approximately 1.5 megawatts per square centimeter. Nevertheless, it should be apparent that many other pump sources other than the pulsed nitrogen laser source 12 could be used and that transverse discharge lasers are also not essential to our invention, even though it is desirable to form the pumping laser beam into a sheet illuminating a circumferential strip of the film 11.

The polyurethane film 11 had a refractive index of 1.55. It can be coated on the surface of the Pyrex glass rod 13 of index 1.47 by conventional techniques like dipping, spraying, painting. The rhodamine 6G dopant must be maintained uniformly in the film. This can be done by mixing the polyurethane before its polymerization with the rhodamine or with a solution of the rhodamine in a suitable organic solvent like ethanol. In our successful experiments we have found a desirable concentration of the rhodamine 6G dye to be between $10^{-3}$ and $10^{116}$ 1 moles per liter in the film and that a desirable film thickness is about 0.8 micrometer.

While our prism 14 had an index of 1.64, it should be apparent that many alternatives for output coupling are available. For example, diffraction grating-type couplers are also feasible and may be coated onto the surface of film 11 in a limited region thereof. The latter type of coupler may be of the general type disclosed in the copending patent application of H. W. Kogelnik, Ser. No. 67,857, filed Aug. 28, 1970.

In the operation of the embodiment of FIG. 1, we observed gains as high as 100 dB/cm. These gains were determined by measuring the amplification of the spontaneous emission, as described in the copending patent application of R. F. Leheny and K. L. Shaklee, Ser. No. 112,237, filed Feb. 3, 1971, and assigned to the assignee hereof. The two output beams are well collimated in the vertical direction because of the narrow height (approximately 0.2 millimeter) of the pumped region. In the horizontal direction they are spread out over an angle of approximately 1° because of the finite spectral width of the laser light and the curvature of the film. The curvature of the thin film 11 results in an approximately Gaussian intensity distribution in the horizontal plane of the output beams. Such Gaussian distribution is the most desirable for many applications, such as those using nonlinear optical devices, and is therefore a particularly attractive feature of the prism-film coupling scheme when used with the thin-film ring laser.

The reason for the Gaussian intensity distribution lies in the particular nonuniform width $S(x)$ of the coupling gap between the base of the prism 14 and the film 11. The direction $x$ is indicated in FIG. 1 and is tangent to the cylinder at the center of the coupling region. The gap width can be written as $$S(x) = S_0 + x^2/2R . \quad (1)$$

Here $S_0$ is the minum width of the gap, and $R$ is the radius of curvature of the thin film 11. Using Equation (1) and the mathematical formalism given in the *Journal of the Optical Society of America, Vol. 60*, pages 1337–1350, it can be shown that the output beams have a Gaussian cross section in the horizontal plane. It is assumed here that only a small fraction of the circulating power in the laser is coupled out. The waist radius $w$ of the beams, measured at the prism base along the $x$ direction, is approximately $$w = R\lambda\pi^{-1}(N^2 - \eta_2^2)^- . \quad (2)$$

Here $\lambda$ is the wavelength of laser oscillation, $\eta_2$ is the refractive index of the medium outside of the film 11, and $N$ is the effective refractive index of the film.

Our experiment showed that the gap width $S_0$ between the prism and film, while not measured, could be optimized by adjusting the pressure between the prism and the laser rod to obtain maximum output coupling. Typically, this gap width is less than one wavelength of the light.

It may appear that there should also be radiation loss caused by the curvature of the thin-film guide 11. Such radiation would leave the laser in a tangential direction and would be highly collimated in the plane of the ring. Our quantative estimates show, nevertheless, that this output coupling mechanism is entirely negligible. Specifically, it is less than $10^{-10}$ per round trip for the 2.5 millimeter radius of curvature of rod 13. Such losses will be below the above-stated level for radii of curvature as small as 0.5 millimeter.

In our experimental arrangement of FIG. 1, only a small fraction of the pump intensity supplied to the film 11 is actually used for pumping the laser because the single-mode film 11 is so thin that it absorbs only very weakly. In addition, at both ends of the pump region the angle of incidence of the pump light with respect to the normal to the film is so large that a considerable fraction of the pump radiation is reflected. We estimate that about 1 kilowatt of the pump light is absorbed in our arrangement. The measured output of intensity was about 100 watts in each of the two emerging beams. It appears, therefore, that the net efficiency of this laser must be quite high. It is apparent that the overall efficiency of the laser could be considerably improved and the total pump power requirements reduced by providing means for passing the pump light repeatedly through the film or by pumping on a stronger absorption band of the dye dopant of film 11. For the rhodamine 6G, this would be achieved by pumping in its green absorption band, where its absorption cross section is more than an order of magnitude larger than at 3371 A.

Figure 2B:
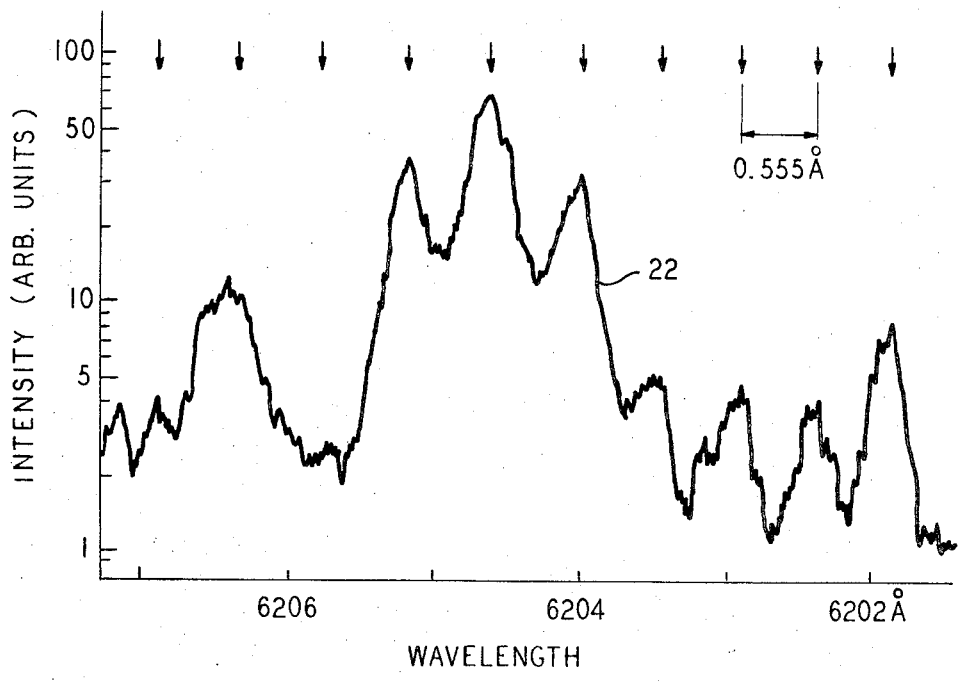

In FIG. 2A is shown a curve 21 of the relative intensity of the laser output as a function of wavelength between about 5800 A and 6600 A. The spectrum peaks at about 6200 A, as shown by curve 21 of FIG. 2A. This relatively long wavelength is a result of the heavy doping of $8\cdot10^{-3}$ mol/liter in the film. For lighter doping, the spectrum shifts to shorter wavelengths. The bandwidth of the laser at half intensity is 110 A. This is much narrower than the width of the spontaneous emission of several hundred Angstroms, as measured in the same host material. Such a narrowing of the output spectrum is also characteristic of super-radiant emission. Nevertheless, a direct proof of positive feedback within the pumped region of film 11 around rod 13 is obtained from our observation of the individual circumferential modes of laser oscillation having a frequency spacing characteristic of the ring laser resonator. Our observation of these modes is illustrated by curve 22 of FIG. 2B. In curve 22 of FIG. 2B we have plotted the relative output intensity in arbitrary units similar to those of FIG. 2A but on a much more finally resolved frequency scale centered about 6204 A, and have marked the individual mode peaks by small arrows above curve 22. These arrows may be seen to be equally spaced by about 0.555 A. Their mode spacing may be determined analytically by analogy to the longitudinal mode spacing of Fabry-Perot laser resonators using two separate reflectors. The theoretical mode spacing is $$\Delta\lambda = \lambda^2/\pi d N_g \qquad (3)$$

where $d = 2R$ is the diameter of the rod, and $N_g = c/v$ group is the effective group velocity index of the guide.

Corresponding to the transverse modes of a Fabry-Perot laser resonator are the radial and axial modes of the thin film on the outside of the rod. The radial modes are the well-known $TE_m$ and $TM_m$ modes of a thin-film guide. Our films permitted propagation of only the fundamental ($m=0$) modes in the radial direction. In the axial direction, there are no relevant boundaries to define axial modes in the absence of pumping. However, in the pumped rod the strip of high gain is bordered at both sides by unpumped, slightly lossy regions of the film defining the modes in axial direction, the fundamental one having the lowest loss.

From the observed uniform distribution of the light intensity across the output beams and from the diffraction limited divergence, we conclude that we did obtain laser oscillation in the fundamental transverse (radially as well as axially) mode of the ring laser. However, any nonuniformity of the thin-film guide, e.g., a dust particle, will spoil the ideal modes described above. When pumped near such nonuniformity, the laser output beams broke up into a series of several horizontal lines. They covered a wider vertical angle than the fundamental mode. This indicates oscillation of higher order axial modes.

For the rod of 5mm diameter and a group velocity index of the guide of $N_g = 1.584$, the longitudinal mode spacing is only $\Delta\lambda = 0.154$ A, which is difficult to resolve with a grating spectrometer. In order to increase the mode spacing to a measurable value, we pumped a thinner rod of 1.397 millimeter diameter having a theoretical mode spacing of $\Delta\lambda = 0.551$ A. The resolved output spectrum of this rod is the one shown in FIG. 2B. The individual modes are clearly separated. Their measured spacing is $0.555 \pm 0.005$ A, in good agreement with the theoretically expected value. In the thin rods the axial mode structure was not as clean as in the 5mm thick rod. We believe that this is the reason for the weak secondary set of lines observed in FIG. 2B. In order to prove that we have seen the longitudinal modes of the ring resonator and not the spectrum due to any structure of the rhodamine 6G molecule, we pumped another thin rod of 1.054 millimeter diameter. This one was doped less heavily and had its peak output at 6050 A. Its theoretical mode spacing is $\Delta\lambda = 0.696$ A; we measured $0.71 \pm 0.02$ A.

As in other host materials, the rhodamine 6G showed irreversible bleaching, resulting from the pump radiation. This effect limited the laser operation to about $10^3 - 10^4$ shots at a given spot on the laser rod. Laser action started again when the pump beam was moved to a fresh spot on the rod.

Figure 3:
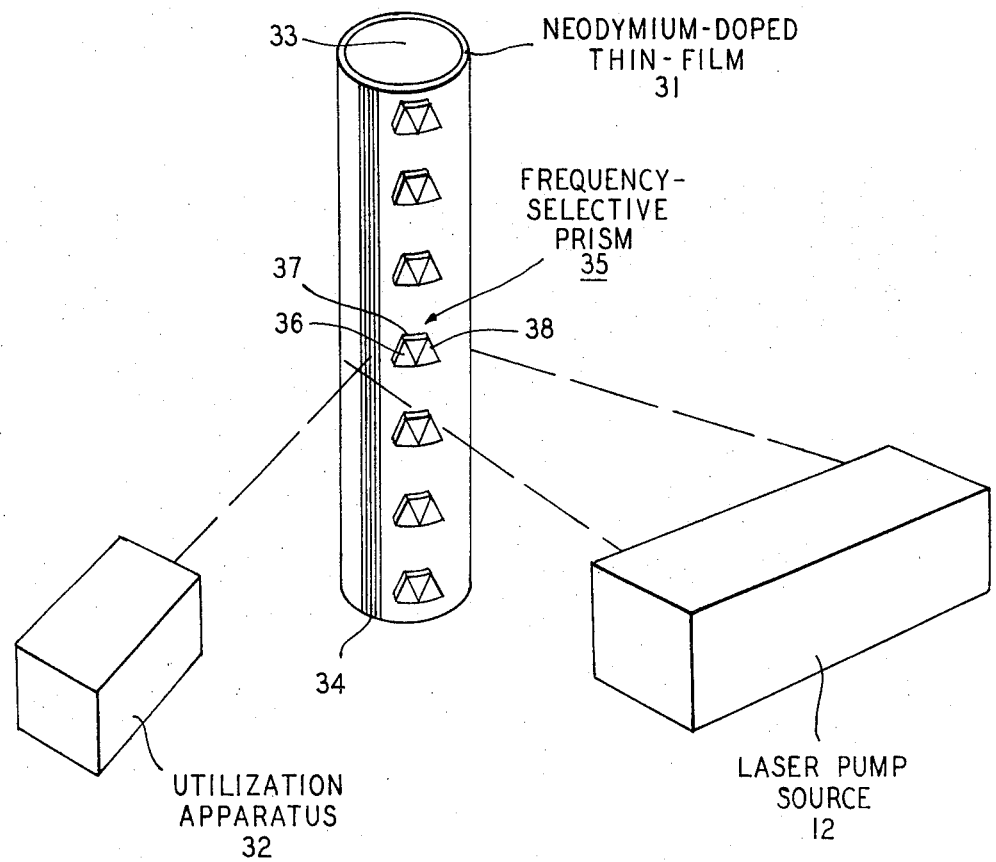
FIG. 3 shows a modified embodiment of our invention, useful for obtaining a frequency-selective output.

The embodiment of FIG. 3 is modified from that shown in FIG. 1 in order to provide a frequency-selective laser oscillation about the axis of the rod 33 and a corresponding output of coherent light of the selected frequency to the utilization apparatus 32. A narrow-band or single-frequency output is desirable for many uses, including that in which the utilization apparatus 32 could, for example, be a modulator in an optical communication system.

The rod 33 is a transparent dielectric of the type described above in FIG. 1 and the film 31 coated upon the lateral surface thereof may be a dye-doped polymer or other dielectric film of the type disclosed above for the embodiment of FIG. 1. Also, as in FIG. 1, the laser pump source is selected to have a frequency permitting at least a portion of the pump energy to be absorbed by the active medium in film 31.

Two principal differences from the embodiment of FIG. 1 stand out in the modified embodiment of FIG. 3; first, the output coupling is illustratively provided by a diffraction grating 34 ruled in the surface of film 31 in a direction transverse to the oscillation path about the axis of cylinder 33. An output coupling prism thereby becomes unnecessary. Second, a frequency-selective prism 35 is provided in the closed oscillation path and, indeed, may be replicated at a number of other axial positions for other possible oscillation paths in film 31, as shown. Each such frequency-selective prism 35 includes the triangular prism elements 36, 37 and 38. The prism elements 36 through 38 are illustratively regions of differing thicknesses both with respect to the surrounding area of film 31 and with respect to their neighboring prism elements. The differing thicknesses provide the differing phase propagation constants in the three prism elements which are advantageous for a high degree of frequency selectivity. The combined effect of the three prisms 36, 37 and 38 is that they provide a closed feedback path only for one selected wavelength of light. The light of different wavelengths is deflected by the prisms into spiraling paths on the rod 33, thus preventing feedback for these undesired wavelengths. The operation of such prisms has been described in the copending patent application of R. J. Martin and R. Ulrich, Ser. No. 835,484, filed June 23, 1969 and assigned to the assignee hereof, now U.S. Pat. No. 3,614,198, issued Oct. 19, 1971.

In the operation of the embodiment of FIG. 3 for the illustrative case in which the active medium is a rhodamine 6G dye in a polyurethane film 31, the broad oscillation band obtainable when source 13 supplies pumping power above threshold, makes such frequency selection desirable. Even in the case of active media with oscillation bandwidths less than that of dyes, such frequency selection is still advantageous. For example, the active medium could be trivalent neodymium ions distributed through a glass film 31 of higher refractive index than a central glass rod 33. The thickness of film 31 would be chosen to be about one half-micron, depending on the index difference, to provide good transverse mode control of the neodymium laser oscillation, and the frequency-selective prism 35 would supply sufficient selectivity for single-axial-mode oscillations near 1.06 micrometers. Such complete mode selectivity of the 1.06 micrometer neodymium laser oscillations has not been achievable in any simple and reliable apparatus heretofore.

It is readily apparent in the embodiments of both FIGS. 1 and 3 that, if one were to take a thin cross-sectional slice of the cylindrical structure, an essentially similar ring laser structure is still obtained. The visualization of this modification illustrates that the present invention is compatible with thin-film optical devices.

Figure 4:
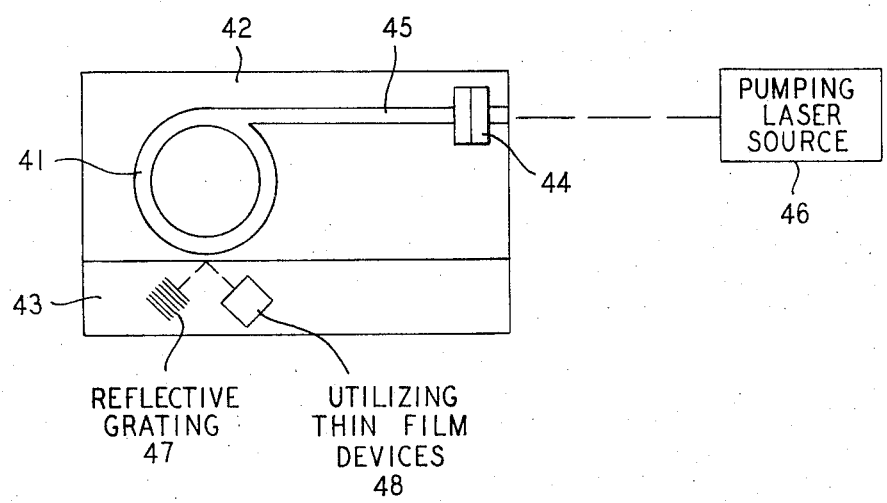
FIG. 4 shows a modified embodiment useful in thin-film integrated optical circuits.

Thus, a thin-film ring laser suitable for supplying laser light to other thin-film optical devices is shown in the modified embodiment of FIG. 4.

In FIG. 4 the cylindrical rod of the previous embodiments is replaced by a substrate 42 on a major surface of which the thin-film active medium 41 is deposited in a ring-like shape thereon about an unoccupied region of the substrate. Here, the thinnest dimension of the film is orthogonal to the radius of curvature. To provide output coupling, another thin-film region 43 is deposited on substrate 42 with a separation of the order of magnitude of one oscillation wavelength therefrom. Laser pumping light is coupled into the ring 41 by a coupling prism 44 into a guiding path 45, which may or may not include active medium, which merges with ring 41 in a direction tangent thereto to provide continuous guiding of the pumping light. The pumping light is supplied from pumping laser source 46, which could be essentially similar to the pumping sources employed in the previous embodiments, with the exception that the pump light must be focused into the prism 44 at a suitable angle and with a suitable width to be coupled into the guide region 45 in a phase-matched manner. The use of a phase-matched prism film coupling is essentially the same as that disclosed in the above-cited copending allowed application of P. K. Tien.

In the embodiment of FIG. 4, the utilization apparatus would typically be thin-film devices 48 which may be disposed in the thin-film region 43. These devices 48 could include modulators, optical guides, amplifiers and detectors. Also, while the devices 48 are shown compactly, it should be understood that the transmission of the light in such devices could occur over a substantial distance.

In the operation of the embodiment of FIG. 4, which is otherwise similar to that of the preceding embodiments, it may be desirable to obtain maximum utilization of the active medium by providing unidirectional traveling wave oscillations about the ring instead of the standing wave oscillations that are the resultant of oscillations traveling in both directions about the ring. To this end, one of the directions of oscillation is quenched by reflecting a portion of that oscillation coupled into region 43 back upon itself into ring 41. The other direction of traveling wave oscillation then predominates and grows at the expense of the other direction of oscillation.

In all of the foregoing embodiments it should be understood that the ring-like path in which oscillations occur need not be circular; but it should have at all points a sufficiently large radius of curvature so that guiding is maintained. For example, an elliptical oscillation path appears to be feasible. As a corollary, the rod 13 of FIG. 1 need not be cylindrical; and, even if elliptical, need not have two symmetrically disposed foci. In the latter case, the rod does not have a uniquely definable axis. Thus, in the claims hereafter, the word 'axis" should be read to be any axis about which the surface of the rod curves. Moreover, in such a case, for films 11 providing sufficiently tight optical guiding, a sufficient restriction upon the shape of the rod surface is that the first derivative of its curvature be continuous. This condition provides a smooth surface of the type suitable for optical guiding. Similar restrictions on the curvature of the oscillation path can be stated for the other embodiments. The capability of the guiding thin film to guide the light around a point of maximum curvature in such a case is determined by the smallness of the dimension of the film along the radius of curvature.

Various techniques can be used to produce a light-guiding film containing active molecules or ions. In our experiments we used films of polyurethane. These films were produced by mixing a solution of the monomeric material with a suitable chemical reagent catalyzing the polymerization process. In addition, the dye is added to this solution. The solution is applied to the surface of the glass rod by dip-coating, although it could be done also by spraying or brushing the solution on the rod. The rod is then held in a vertical position, and upon evaporation of the solvent, a thin, soft film is left. The polymerization is achieved by gently heating (e.g., to 100° C) the rod for a length of time (e.g. 1 hour). The curing temperature must be low enough so as not to cause thermal decomposition of the dye. The thickness of the film thus produced depends on the solid content and the viscosity of the solution, and on the temperature of its application. Typical values are a solid content of 10 percent by volume, and a viscosity of 20 cps.

It is clear that this method of fabrication is possible for a great variety of other polymer films and other dyes, for example films of polystyrene, polyester, polymethyl methacrylate and epoxies. Another possible dye is sodium-fluorescein giving a laser operation in the green, or any soluble chemical compound containing trivalent neodymium.

The light-guiding film need not be an organic polymer. Films of good optical quality can be prepared by wet chemical methods, producing mixtures of silicon dioxide and lead oxide of a gel-like consistency. Upon mild heating (100° C) these films become hard and glassy. Here again the dye is mixed with the solution before it is applied on the rod.

The light-guiding films may alternatively be produced by vacuum deposition or sputtering of a glassy or crystalline material on the rod or other substrate. In these cases, one can, for example, bring ions of neodymium into the film either by simultaneous evaporation or sputtering of a suitable neodymium compound (e.g. $Nd_2O_3$), or by a subsequent diffusion process in which the completed film is immersed into a hot, concentrated solution containing trivalent neodymium.

I claim:

1. A ring laser in which coherent optical oscillations occur when supplied with pumping energy, comprising a first body including an active medium and forming a closed, continuously-curved ring-like feedback path for said oscillations about a central axis, a second body extending through said axis, said second body having a lower index of refraction than said first body and a smooth continuously curved major surface adjoining said first body along said path, said first body having a dimension transverse to said path and orthogonal to said major surface of the order of an expected oscillation wavelength to waveguide said oscillations, means for supplying said pumping energy to said body, and means for coupling a portion of said oscillations from said body through a major surface thereof.

2. A ring laser according to claim 1 in which the second body comprises a dielectric rod the axis of which is the central axis and the first body extends about and in continuous contact with the lateral surface of said rod to form the closed feedback path about the axis of said rod.

3. A ring laser according to claim 1 in which the first body includes in the closed feedback path at least one region in which the transverse dimension of the order of the oscillation wavelength is varied along said path to select a value of said oscillation wavelength.

4. A ring laser comprising a rod having a smooth, continuously-curved lateral surface and comprising a transparent dielectric material, and deposited on said rod about the axis thereof a mixture of a dielectric medium and an active medium forming a closed, continuously-curved ring-like feedback path for optical oscillations about the axis of said rod, said mixture having a smooth, continuously-curved major surface continuously in contact with said lateral surface along said path and having a thickness orthogonal to said major surface of the order of magnitude of an optical emission wavelength of said active medium to waveguide said oscillations with respect to the curvature of said continuously-curved feedback path, and means for coupling optical energy out of said mixture through a major surface thereof.

* * * * *